Sept. 18, 1962 J. L. CIRINGIONE ET AL 3,054,284
APPARATUS FOR TESTING TORSIONAL VIBRATION DAMPERS
Filed April 18, 1960 4 Sheets-Sheet 1
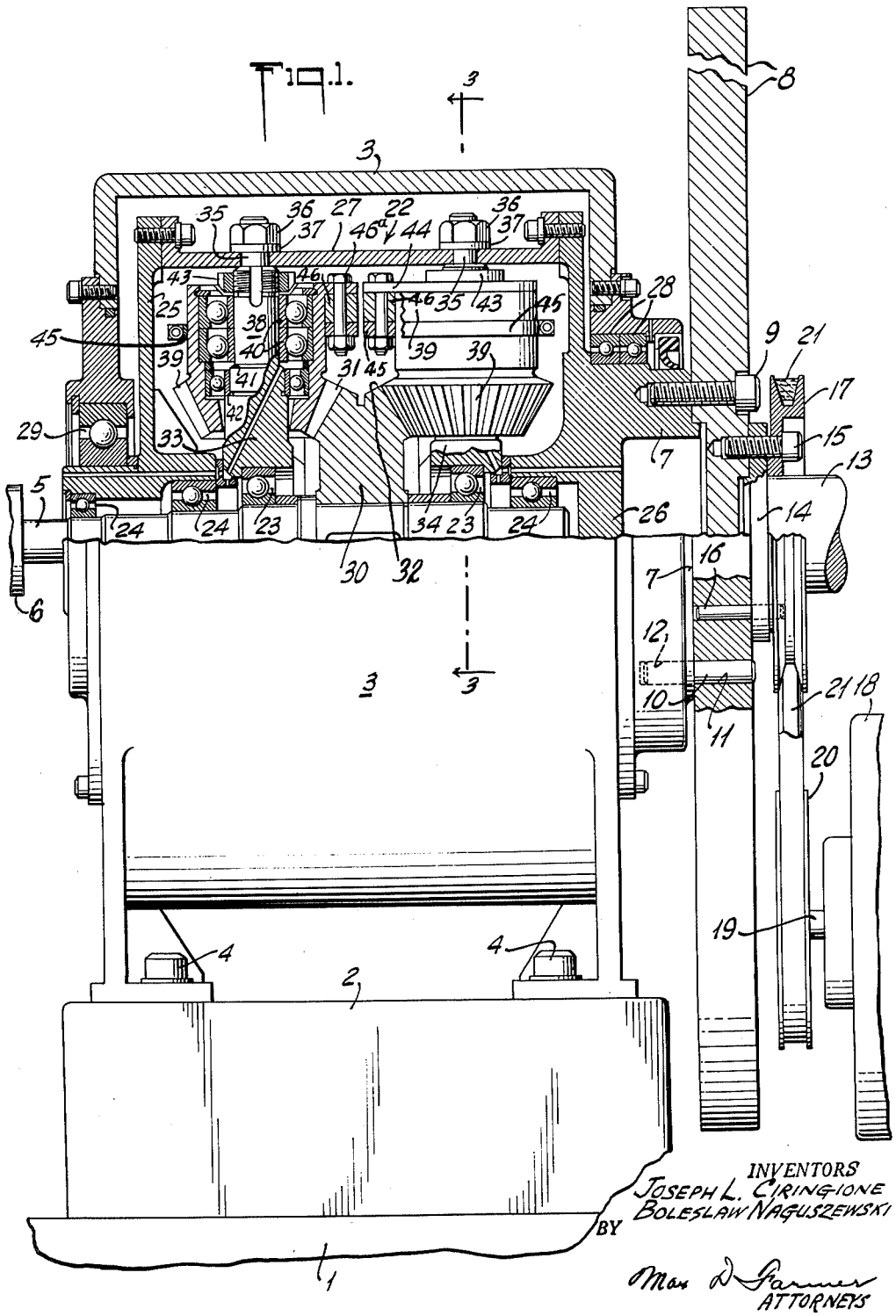
INVENTORS
JOSEPH L. CIRINGIONE
BOLESLAW NAGUSZEWSKI
BY
Max D. Farmer
ATTORNEYS

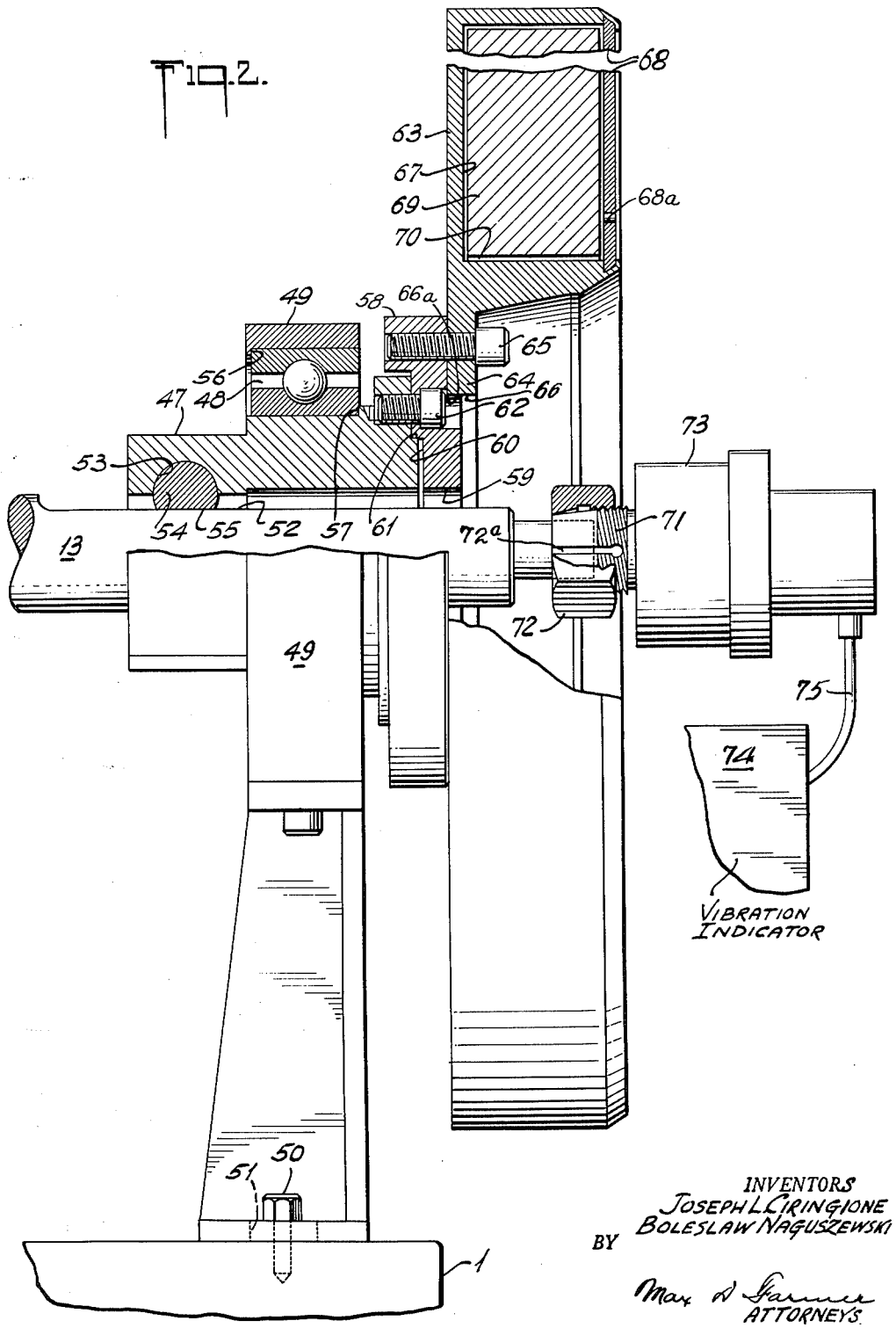

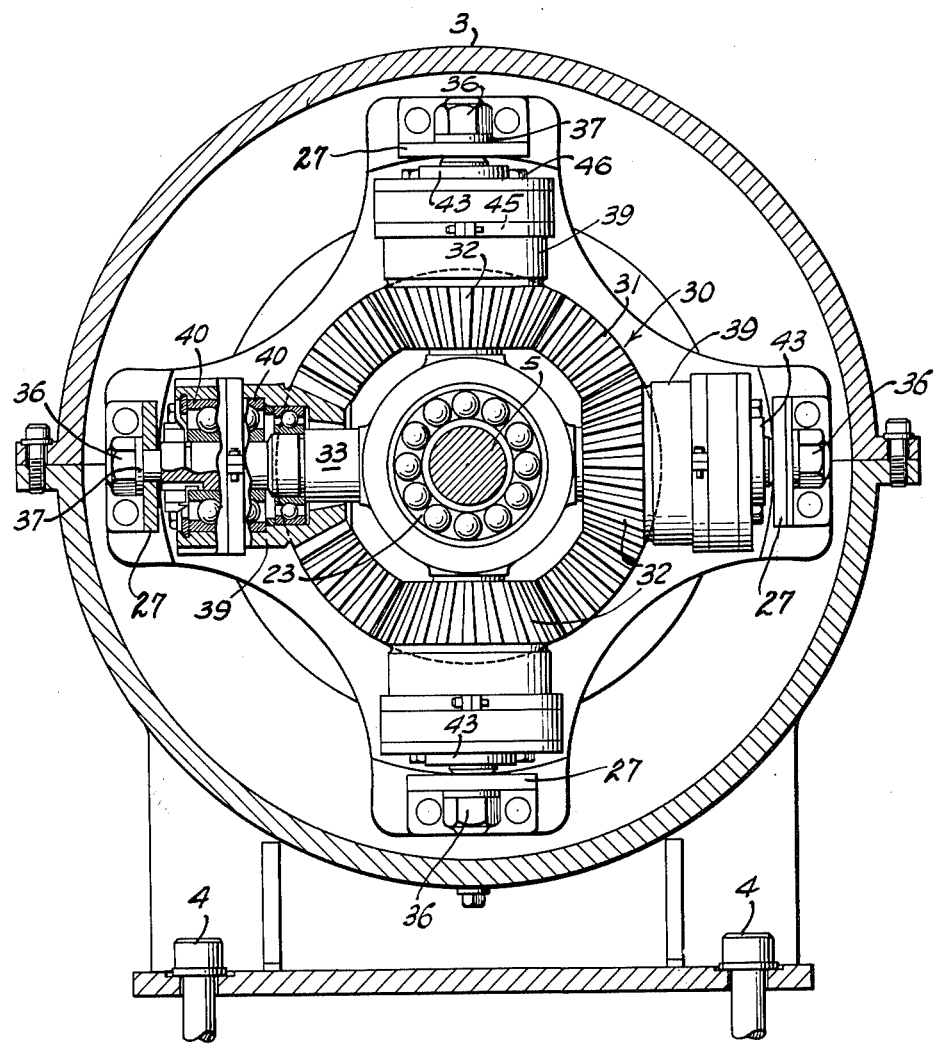

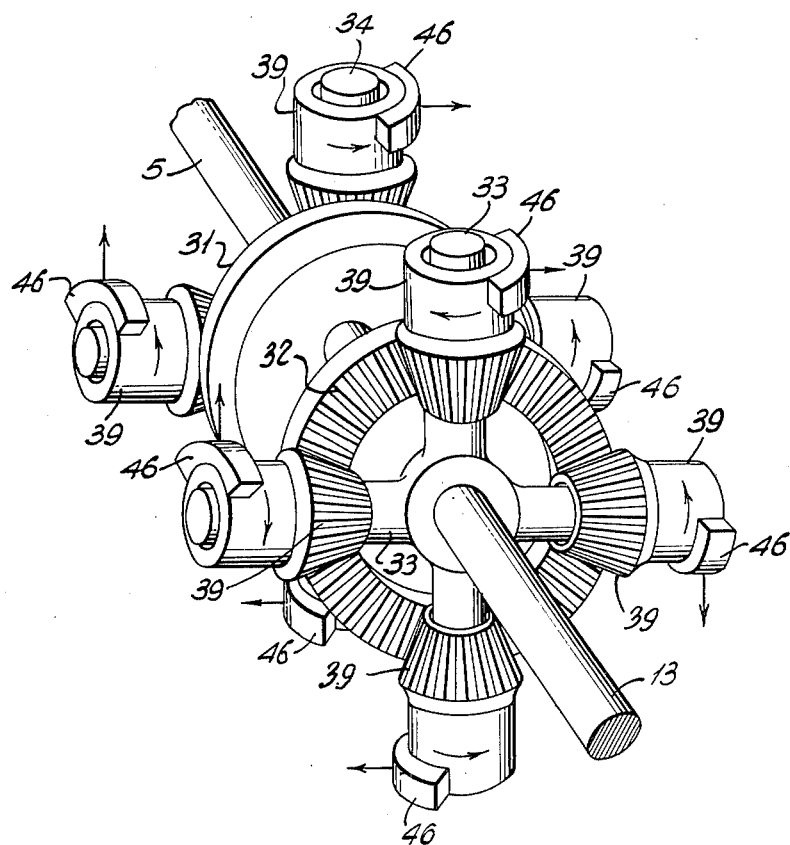

United States Patent Office 3,054,284
Patented Sept. 18, 1962

3,054,284
APPARATUS FOR TESTING TORSIONAL VIBRATION DAMPERS
Joseph L. Ciringione, Bellmore, and Boleslaw Naguszewski, New York, N.Y., assignors to the United States of America as represented by the Secretary of the Navy
Filed Apr. 18, 1960, Ser. No. 23,107
14 Claims. (Cl. 73—67.2)
(Granted under Title 35, U.S. Code (1952), sec. 266)

The invention described herein may be manufactured and used by or for the Government of the United States of America for governmental purposes without the payment of any royalties thereon or therefor.

This invention relates to the testing of torsional vibration dampers, under simulated conditions of use, to determine their dynamic damping constants and other functional characteristics.

Torsional vibration dampers have been used widely in high speed diesel engines to reduce the danger of breakage of their crankshafts due to torsional vibrations, and the design of such dampers for a particular engine has been based to a great extent upon empirical estimates of the vibratory energy to be absorbed by the damper in reducing the engine torsional vibration to acceptable levels. The evaluation of the adequacy of a damper design has hitherto been based on its performance on an engine. The need for some device for direct measurement of damper performance before installation on an engine has long been recognized, but heretofore no entirely satisfactory one has been available.

An object of this invention is to provide a device for simulating engine operational conditions such as on diesel engines, on which torsional vibration dampers may be tested and their performance characteristics determined during such simulated use, with which the resonant frequency of oscillation or vibration may be varied, with which the device will have a minimum of vibration due to unbalanced forces, with which an oscillatory motion may be imparted to the mass elastic system and the damper to be tested rotated at speeds corresponding to the operational speed of an engine, which will be relatively simple, practical, compact, convenient and inexpensive, and which may be operated by relatively non-technical personnel.

Another object of the invention is to provide simple means for easily and rapidly testing torsional vibration dampers under operating conditions simulating those existing when the damper is coupled to an engine in use, so as to ascertain the dynamic damping constants and other performance characteristics of torsional vibration dampers prior to their application to engines in use, in which an oscillatory motion is superimposed upon a pure rotation, with which any unbalanced forces created in operation will be so phased that they are additive in directions to balance out each other in planes crosswise of the plane of such oscillatory motion.

Another object is to provide an improved, practical, and simple apparatus for testing the performance of torsional vibration dampers for engines and the like, before attachment to an engine, but under operating conditions closely simulating those to which the dampers are expected to be subjected in use on an engine crankshaft.

Other objects and advantages will be apparent from the following description of an example of the invention, and the novel features will be particularly pointed out hereinafter in connection with the appended claims.

In the accompanying drawing:

FIG. 1 is a side elevation, partly in section of one part of a testing device embodying the invention;

FIG. 2 is a similar side elevation of another part of the same testing device, the parts shown in FIGS. 1 and 2 representing side by side coupled parts, with the part of FIG. 1 at the left;

FIG. 3 is a sectional elevation through the part shown in FIG. 1, the section being taken approximately along the line 3—3 of FIG. 1; and FIG. 4 is a schematic perspective illustrating the principle of operation of the sun and planet gear assembly of FIG. 1.

Considering first FIGS. 1 and 2 when disposed side by side, with FIG. 1 at the left, the illustrated embodiment of the testing apparatus includes a base 1 having on its upper face a sub-base 2. A housing 3 is mounted on the sub-base 2 by screws 4. A main shaft 5 extends outwardly through this housing 3 at one end thereof, where it is coupled to and is rotatably driven by a reversible, variable speed motor 6. A tubular hub 7 extends outwardly through the opposite end of said housing, and an inertial tuning mass or exciter fly wheel 8 is aligned with and detachably coupled to the outer end of hub 7 by screws 9 that pass through the flywheel and are threaded into the end of the hub. The wheel 8 telescopes over and fits a radially outwardly facing shoulder 7a on the outer end face of hub 7, which serves to center the wheel on the hub. Dowel pins 10 whose ends are received in passages 11 of the flywheel and recesses 12 of the hub end, serve to locate the flywheel on the hub end and hold it securely against rotation relatively to the hub about the hub axis. The screws 9 confine the flywheel against its separation from the hub in a direction axially of the hub.

An auxiliary or driven shaft 13 is axially aligned with the hub end and has an external peripheral flange 14 at its end nearest the hub, which flange and shaft end abut against that face of the flywheel 8 that is opposite from the hub 7. Screws 15 pass through the flange 14 and are threaded into the flywheel to confine and couple the shaft 13 to the flywheel and through it to the hub 7. Dowel pins 16 pass through the flange 14 into the flywheel to locate the shaft end relatively to the flywheel and secure the shaft 13 to the flywheel for positive rotation therewith without play or looseness. A V-groove pulley 17 fits over shaft 13 and abuts face to face with the flange 14 of the shaft, and the screws 15 that confine the shaft against axial separation of the shaft 13 from the flywheel pass through this pulley 17 and confine it fixedly to the shaft 13 for rotation therewith.

Another variable speed, reversible motor 18 is mounted on the base 1 adjacent to the shaft 13, and the rotary drive shaft 19 of this motor carries a V-groove pulley 20 aligned in the same plane with the pulley 17. A V-belt 21 runs over and connects the pulleys 17 and 20, so that the motor 18 rotatably drives the shaft 13 and through it the flywheel 8 and the hub 7.

The hub 7 is one end of a cage 22 that is contained within the housing 3 and which is rotatably mounted on the inner or free end of shaft 5 by several antifriction bearings 23 and 24. This cage 22 is formed of two end plates 25 and 26 that are rigidly coupled together by four cross bars 27 arranged at equal intervals about the axis of the shaft 5. The end plate 26 of this cage is rotatably mounted in one end of the housing by an antifriction bearing 28, and the end plate 25 of the cage is rotatably mounted in the opposite end of the housing by an antifriction bearing 29. A sun gear 30 is mounted on the shaft 5 in the space between the bearings 23 and keyed to the shaft 5 for rotation therewith. This sun gear 30 has, along its periphery, two oppositely facing bevel gears 31 and 32.

The cage also includes two four arm spider members 33 and 34 arranged on opposite sides of the sun gear 30, and the bearings 23 are between these spider members and the shaft 5. The free ends 35 of the spider members are reduced in diameter and pass through apertures in the cross bars 27, and their extending free ends are threaded and carry nuts 36 and lock washers 37, which confine the cross bars 27 to the free end portions of the spider member arm against the shoulders on the arms which are formed at the beginnings of the reduced threaded ends 35 of the spider arms. Each arm of each spider member, just inside of the cross bars 27, has a cylindrical zone 38, and on each such cylindrical zone a planet, bevel gear 39 is rotatably mounted with antifriction bearings 40. The cylindrical zone has shoulders 41 and 42 against which the bearings 40 are confined by nuts 43 that are threaded on the free end portions of the arms 34, beneath the cross bars 27. The bevel pinions 39 on one spider member 34 mesh with the sun gear 32, and the bevel pinions on the other spider member 33 mesh with the sun gear 31.

Each pinion 39 has its bevel teeth adjacent to its inner end, nearest the shaft 5, and a cylindrical hub outwardly of the teeth along the spider arm. The outer end of each such hub has a lateral, external flange 44 at one side thereof. A split collar 45 surrounds and fits, and is clamped to, the cylindrical hub somewhat inwardly and spaced from the related flange 44. An arcuate, eccentric weight 46 is disposed on each pinion 39 between the flange and split collar on that pinion and confined thereon by one or more bolts 46a that pass through the weight 46, the flange 44 and the split collar 45 on that pinion. These eccentric weights 46 on the pinions are phased or arranged relatively to one another, as shown in FIG. 4 so that the unbalanced forces due to these eccentric weights are additive in the desired direction of oscillation and balance out each other in planes perpendicular to the plane of oscillation. The four planet pinions 39 on each spider member are symmetrically positioned about the sun gear 30.

Referring now particularly to FIG. 2, a sleeve 47 telescopes over the free end of the driven shaft 13 and is rotatably mounted by antifriction bearing 48 in a pedestal 49 that upstands from the base 1. This pedestal is clamped to the base 1 by screws 50 that pass through slots 51 in the base of the pedestal into the base 1. The slots 51 are elongated in directions parallel to the axis of rotation of shaft 13, so that the pedestal 49 can be adjusted in directions along the shaft 13 to some extent and clamped in any of its such adjusted positions. The bore of the sleeve 47 fits the shaft 13, except that the shaft has a flattened surface or area 52 in one side of the portions along which the sleeve 47 may be adjusted. The sleeve 47 has a transverse passage 53 somewhat offset or off center, and carries a tapered pin 54 with a tapered flat side 55 that abuts against the flat surface 52 of the shaft 13. Since the pin 54 is tapered, as it is driven through the passage 53 it will wedge the sleeve 47 firmly against the shaft 13 and lock the sleeve to the shaft 13 for rotation therewith. The bearing 48 abuts at one end against a shoulder 56 of the pedestal 49 and at its other end against a shoulder 57 on the sleeve 47 periphery.

A flange adaptor member 58 abuts against that end face of the sleeve 47 nearest the free end of shaft 13 and has an aperture 59 through which shaft 13 passes. Member 58 has a recess 60 in its face that abuts the end of sleeve 47, which receives and fits over an annular shoulder 61 on the adjacent end of sleeve 47 and thus centers member 58 on the end of sleeve 47. Screws 62 pass through member 58, with their heads countersunk therein, and their shanks are threaded into the end of sleeve 47 to confine member 58 detachably to the sleeve 47. The damper 63 to be tested has a center web 64 that abuts against the outer face of member 58 and is detachably connected thereto by screws 65 whose shanks pass through the web and are threaded into member 58. Web 64 has a central aperture 66 that clears the shaft 13 with ample clearance, and telescopes over and fits a shoulder 66a on the periphery of the member 58 at the end face of the latter which is opposite from the sleeve 47, which centers the damper on the member 58.

These dampers are well known and need but little description. They have an annular chamber 67 that is closed, on one side, by an annular plate 68. Plate 68 has a normally closed oil filling hole or passage 68a. Within this chamber 67 is an annular inertia mass 69 that has a small clearance space 70 on all sides with the walls of the chamber 67. This clearance space 70 is filled with a selected viscous liquid, such as a silicone oil, that has a nearly flat viscosity curve. This damper is simple with only two parts, the inertia mass and the housing. The inertia mass in the form of an annulus or ring is free to move in the housing with the clearance filled with the viscous fluid. In an actual installation of such a damper, the housing web 64 of the damper is attached rigidly to the engine crankshaft while the inner, free-running damper mass or flywheel, in the form of an annular inertia ring, is separated from it by a thin film of the silicone oil. Because of the high viscosity of this fluid or oil, the damper mass or ring rotates at engine speed. When torsional vibrations are transmitted from the crankshaft to the housing, the damper ring or flywheel, because of its inertia, tends to continue to rotate at constant speed. As a result, the vibrations are damped by the drag of the viscous fluid or oil that separates the inertia mass or ring from the housing, and by its resistance to the shearing action on the oil. In this testing apparatus, various sizes of dampers may be detachably secured for testing to the standard size hub of the flange adapter 58. The free end of shaft 13 extends beyond the web 64, and a self centering collet 71 and nut 72, commercially called a Jacob's chuck, are detachably secured over the free end of the shaft 13. The collect 71 projects axially from an end face of any suitable torsional vibration pickup 73 such as a "Consolidated" torsional pickup made by Consolidated Engineering Corp. of California, which indicates, with the use of proper instrumentation, the amplitudes and frequency of oscillation experienced by the housing of damper 63. The free end of the collet 71 is split lengthwise for some distance, as at 72a, and this split end fits snugly over the free end of shaft 13. Tightening of nut 72 on the collet 71 clamps the collet firmly to the shaft end. A suitable vibration indicator 74 has a flexible operating connection 75 to the pickup 73.

In FIG. 4, the schematic perspective illustrates basic parts of the cage corresponding in function to the parts of the cage, of FIGS. 1–3, to illustrate the relative positions of the eccentric weights 46 as the shaft 5 and the cage (with shaft 13) are driven by their respective motors 6 and 18. The sun gear 30 may be made in two parts, each with its bevel gear 31 or 32, both keyed or coupled to the drive shaft 5, and separated somewhat from one another along shaft 5, as shown in FIG. 4, but for compactness the sun gears may be made of one piece or coupled together face to face as shown in FIG. 1. The ratio between the sun gear and the pinions is preferably about 2:1 for compactness and smoothness in operation. On each spider member 33 and 34, the pinions 39 mesh with the sun gear while their eccentric weights 46 are all arranged at one time on the same relative sides of the pinions in the direction of rotation of the spider member, as shown in FIG. 4, so that as the pinions rotate on the spider member, they will exert inertia forces on the rotation of the spider members and cage in alternate directions in the plane of rotation of the axes of the pinions on each spider member. As the cage and spider members rotate about the axis of shaft 13, the eccentric weights 46 on the pinions carried by one spider member will twice in each pinion revolution be at opposite sides of the pinions relatively to those weights on the other spider member, considered in a direction parallel to the axis of rotation of shaft 13, so that the inertia forces exerted by the eccentric weights on the pinions in directions crosswise of the plane of rotation of the axes of the pinions will balance each other out. In other words, the eccentric weights are so phased that their imbalance forces are additive in the desired direction of oscillation and balance each other out in planes perpendicular to the plane of oscillation.

In operation, after a damper 63 to be tested is mounted on the adapter 58, the machine is first borught up to the proper rotational speed by motor 18. Because of the 2:1 gear ratio of the double sun gear and pinions, the cage assembly 22 will oscillate also at 2X rotational speed. The motor 6 will then be run in the desired direction to increase or decrease the frequency of oscillation. In this way the damper will be subjected to the same relative conditions of speed and frequency of oscillation as may be encountered in an engine. The position of the damper along the length of the shaft 13 has to be adjusted so as to cause resonance of the machine at desired conditions of speed and frequency of oscillation.

The ability of a torsional viscous friction damper to absorb the maximum vibratory energy must be measured at the point of optimum damping or the common point frequency. The location of this point is at the intersection of the resonant curves of a mass elastic system including a damper, and operating through a range from infinite damping to zero damping. The common point frequency for any specific damper can be estimated from the following expression for the damping constant of a damper:

$$c = I_a W$$

where $c$ = damping constant, # in./rad.sec.
$I_a$ = damper flywheel inertia, # in. sec.$^2$
$W$ = common point frequency, rad./sec.

Knowing the values of $c$ for which the damper is designed and the inertia of the damper flywheel, the common point frequency $w$ can be calculated.

The procedure followed in testing of dampers is to first plot the resonant curves for the zero and infinitely damped systems. Infinite damping occurs when the damper flywheel mass is locked to the damper housing, and zero damping when the damper mass has no effect on the system. The mass elastic system is adjusted by trial and error until the resonant curves for the infinitely and zero damped conditions intersect at a frequency corresponding to the estimated common point frequency. This adjustment is made by movement of the damper and pedestal 49 along shaft 13 or by changing the weight of the flywheel 8 on the cage 22. Through this common point of the system will pass all resonant curves regardless of the value of the damping constant $c$. A "good damper" will produce a resonant curve which is truly tangential to a horizontal line at the common point frequency. The value of the damping constant then can be calculated from the expression $c = I_a w$ which will be in agreement with the design optimum value for this damper. A "bad damper" will produce resonant curves of greater amplitudes and peaking at frequencies lower or higher than the common point frequency. The condition of resonance to the left of the common point frequency indicates partial seizure of the damper flywheel and consequently a higher damping constant than the optimum value for the system; resonance to the right of the common point indicates a breakdown in the silicone oil or increased clearances between the damper flywheel and the walls of the damper housing resulting in a lower damping constant than the optimum. To determine the actual damping coefficients of the "bad dampers" the same procedure is followed in adjusting the mass-elastic system for a common point frequency which would satisfy the "bad damper"; that is the mass elastic system is adjusted by trial and error until the resonant curve of the "bad damper" is truly tangential to a horizontal line at the new common point frequency. Then the expression $c = I_a w$ can be applied. It can be seen from this expression that the common point should be at higher frequency if the value of $c$ is greater than the optimum value of a good damper and conversely it should be lower if the value of $c$ is lower.

It will be observed from the foregoing that the damper testing apparatus is a two mass elastic system with the adjustable length shaft 13 as the torsional spring member and with the two ends as the inertial masses. The damper hub, or adapter for mounting the damper, is caused to oscillate against the combined inertia of the inertial tuning mass and the exciter cage assembly 22. Tuning to the desired resonant frequency of oscillation is accomplished by changing the effective length of the torsional spring member which is shaft 13. This may be done by movement of pedestal 49 along the base so that the damper will be clamped to shaft 13 at any of different points or zones along the length of that part of the shaft 13 having the flat area 52. This resonance could also be varied by adding or subtracting weight to the tuning inertial mass disc 8, or by substituting discs 8 of different sizes or weights. The sleeve 47 with the damper 63 secured to it is locked to the shaft 13 at the desired, variable position by means of the tapered pin 54 which is tightened in the passage of the sleeve at right angles to the length of the shaft 13 and offset from the axis of that shaft. By tightening the nut (not shown) on the threaded end (not shown) of the pin 54, the tapered flat face 55 of the pin 54 is brought in contact with the flat area of the shaft, thereby accomplishing a wedging effect that locks the sleeve 47 to the shaft 13. In addition to the oscillatory motion imparted to the mass elastic system by the exciter unit (the cage with the planetary gear system) the entire assembly is rotated at speeds corresponding to the operational speed of an engine for which the damper was designed. The basic function of the exciter unit is therefore to provide a selected oscillatory motion superposed upon a pure rotation.

It will be understood that various changes in the details, materials and arrangements of parts, which have been herein described and illustrated in order to explain the nature of the invention, may be made by those skilled in the art within the principle and scope of the invention as expressed in the appended claims.

We claim:

1. Apparatus for testing torsional vibration dampers under conditions simulating those to which the damper would be subjected in use, to determine the dynamic damping constants and other performance characteristics of such damper, which comprises a main shaft and an auxiliary shaft disposed in end to end axial alignment, means by which a damper to be tested may be detachably and concentrically mounted on that end portion of said auxiliary shaft which is remote from the main shaft for rotation with said auxiliary shaft, means mounting both of said shafts for independent rotation on their aligned axes, a frame mounted to rotate freely on said main shaft and coupled to said auxiliary shaft for rotation therewith, means interposed between said frame and said main shaft for applying to said auxiliary shaft, during rotation of the latter, torsional vibratory impulses in a plane crosswise of the axis of rotation of the auxiliary shaft, means connected to the free end portion of said auxiliary shaft for indicating the amplitude and frequency of the impulses imparted to any said damper being tested on the auxiliary shaft during rotation of the latter, and means for causing selective and independent rotation of said shafts.

2. The apparatus according to claim 1, wherein said means for causing rotation of said shafts is operable to cause rotation of at least one of said shafts selectively in either rotary direction.

3. The apparatus according to claim 1, wherein said means for causing rotation of said shafts is operable to determine selectively the relative speeds of operation of said shafts.

4. The apparatus according to claim 1, wherein said means interposed between said frame and main shaft includes a planetary gear system with the sun part coupled to and rotating with said main shaft, and the planet part rotating bodily with said auxiliary shaft, and the planet part having eccentric weight means rotating individually during said bodily rotation in a direction to impart inertia impulses to the cage.

5. The apparatus according to claim 1, wherein said means interposed between said frame and said main shaft includes a sun gear coupled to and rotating with said main shaft, a plurality of planet pinions mounted on said frame for bodily rotation therewith and also for individual rotation about their own axes, arranged symmetrically about the axis of rotation of said frame, and all meshing with said sun gear, each of said pinions carrying a weight eccentric to its individual axis of rotation and all weights phased to be additive in the desired directions of oscillation of the frame and to balance out each other in planes perpendicular to the plane of oscillation of the frame.

6. Apparatus for simulating the torsional vibrations of a shaft to which a torsional type damper for engine shafts may be subjected in use, to enable one to test such dampers as to performance characteristics separately from such engine shafts, which comprises a main shaft, an auxiliary shaft, said shafts being axially aligned, end to end, each shaft being mounted for individual rotation about its own axis, means for individually rotating such shafts at individually selected speeds, means for detachably mounting a torsional vibration damper on one end portion of said auxiliary shaft for rotation therewith about the axis of said damper, means interposed between said shafts and operated by the relative movements of the shafts during these rotations for imparting to the auxiliary shaft, during rotation of the shafts, torsional vibratory impulses of rotation, a torsional vibration pickup attached to said auxiliary shaft, and a vibration indicator operatively connected to said pickup for indicating the torsional vibrations of said auxiliary shaft as picked up by said pickup.

7. The apparatus according to claim 6, wherein said interposed means includes a sun gear coupled to and rotatable with said main shaft, a member coupled to and rotated by said auxiliary shaft, a planet pinion meshing with said sun gear, carried by said member for rotation thereon and also for bodily rotation with said member while meshing with said sun gear, said pinion carrying an inertia weight making it axially unbalanced and imparting, during its rotation on its own axis, said torsional vibratory impulses of rotation to said member and through said member to said auxiliary shaft.

8. The apparatus according to claim 6, wherein said interposed means includes a sun gear coupled to and rotatable with said main shaft, a member coupled to and rotatable, with said auxiliary shaft, about the axis of said sun gear a plurality of an even number of planet pinions mounted on said member for bodily rotation therewith, arranged symmetrically about the axis of rotation of said member, and each rotatable on said member individually about its own axis, each such pinion being axially unbalanced in its rotation about its own axis, and all of such unbalances being phased relatively to one another to impart additively together said torsional vibratory impulses, and to balance out each other the impulses in directions parallel to the axis of said auxiliary shaft.

9. Apparatus for rotating a shaft, and during its rotation imparting thereto torsional vibrations of selected frequencies and for testing on such rotating shaft, torsional vibration dampers to determine their performance characteristics under conditions simulating their expected use on an engine, which comprises a shaft, means for rotating said shaft about its axis at a selected speed and direction, means for creating in said rotating shaft torsional vibrations in the path of shaft rotation having a selected frequency corresponding to a frequency that may occur in an engine shaft, means on said shaft for detachably mounting concentrically thereon and for rotation therewith, any torsional vibration damper whose performance characteristics at said frequency of torsional vibration are to be determined, and means responsive to the torsional vibrations in such rotatable shaft, during its rotation, by which one may indicate the effectiveness of said damper under such simulated frequency of vibration, said means for creating said torsional vibrations in the rotating shaft including a frame coupled to and rotatable with said shaft, a plurality of axially unbalanced pinions arranged in spaced relation to one another around the shaft axis of rotation, carried by and rotatable bodily with the frame, and also each being individually rotatable on its own axis radial to said shaft axis, the unbalancing of said pinions being phased to be additive to one another in a circular direction around said shaft and to balance out all of said members in a direction parallel to the axis of said shaft, a sun gear meshing with said pinions with its axis aligned with said shaft and causing rotation of said pinions about their own radial axes and also bodily with the units about the shaft axis for imparting torsional vibration to said shaft during its rotation, and means for independently rotating said sun gear at a selected and variable speed.

10. Apparatus for rotating a shaft, and during its rotation imparting thereto torsional vibrations of selected frequencies and for testing on such rotating shaft, torsional vibration dampers to determine their performance characteristics under conditions simulating their expected use on an engine, which comprises a shaft, means mounting said shaft for rotation about the shaft axis, means coupled to one end of said shaft for rotating it about its axis, a member adjustable along and clampable to said shaft at a number of different distances remote from said one end, and formed to receive and detachably hold, concentrically with the shaft, any torsional vibration damper to be tested for rotation therewith, means for imparting to said one end of said shaft, during its rotation, torsional vibrations in rotary directions about the shaft axis, and means cooperating with said shaft adjacent to said member for indicating the torsional vibrations in said shaft adjacent said member.

11. The apparatus according to claim 10, and an inertia element coupled to and rotating with said shaft adjacent said one end of the shaft.

12. The apparatus according to claim 10, and a support bearing rotatably mounting and supporting said member for its rotation with said shaft, and adjustable in directions parallel to the axis of rotation of said shaft to support said member in its adjusted positions along said shaft.

13. Apparatus for rotating a shaft, and during its rotation imparting thereto torsional vibrations of selected frequencies and for testing on such rotating shaft, torsional vibration dampers to determine their performance characteristics under conditions simulating their expected use on an engine, which comprises a shaft, means mounting said shaft for rotation about the shaft axis, means coupled to one end of said shaft for rotating it about its axis, a member coupled to said shaft, at a part of said shaft remote from said one end of the shaft, for rotation with the shaft, means rotatably supporting said member, an adapter secured to an end face of said member, said adapter having a portion formed to receive and detachably mount thereon, concentrically with the shaft axis and for rotation therewith, a torsional vibration damper to be tested, torsional vibration indicating means cooperating with the shaft adjacent to said adapter for indicating the existence and characteristics of torsional vibrations in said shaft adjacent to said damper, and means for imparting to said one end of said shaft, during its rotation, torsional vibrations in rotary directions about the shaft axis.

14. The apparatus according to claim 13, wherein said member is selectively adjustable along said shaft into any of a plurality of positions along the shaft.

References Cited in the file of this patent
UNITED STATES PATENTS

| | | |
|---|---|---|
| 2,522,472 | Van Degrift | Sept. 12, 1950 |
| 2,799,158 | Federspiel | July 16, 1957 |

OTHER REFERENCES

Periodical, N.B.S. Technical News Bulletin, April 1959, pages 72 and 73. (A photostat copy is in Div. 36, 73–67.2.)